United States Patent
Ryne et al.

(10) Patent No.: US 6,450,532 B1
(45) Date of Patent: Sep. 17, 2002

(54) ENERGY ABSORBER FOR MOTOR VEHICLE STEERING COLUMN

(75) Inventors: Patrik M Ryne, Bay City; Melvin Lee Tinnin, Clio, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/723,477

(22) Filed: Nov. 28, 2000

(51) Int. Cl.$^7$ ................................................ B62D 1/11

(52) U.S. Cl. ........................ 280/777; 188/371; 188/374

(58) Field of Search .......................... 280/777; 188/371, 188/372, 373, 374, 377

(56) References Cited

U.S. PATENT DOCUMENTS

| | | | |
|---|---|---|---|
| 3,392,599 A | | 7/1968 | White |
| 5,425,553 A | * | 6/1995 | Yazane et al. ............... 280/777 |
| 5,615,916 A | * | 4/1997 | Fujiu et al. .................. 280/777 |
| 6,170,873 B1 | * | 1/2001 | Jurik et al. .................. 280/777 |
| 6,176,151 B1 | * | 1/2001 | Cymbal ....................... 280/777 |
| 6,224,104 B1 | * | 5/2001 | Hibino ......................... 280/777 |
| 6,272,945 B1 | * | 8/2001 | Jolley ............................ 74/493 |

OTHER PUBLICATIONS

"Energy Absorbing Strap Retainer Applicable to Rake, Telescope, Rake and Telescope, Tilt, Tilt and Telescope, Fixed Steering Column Assemblies."; Research Disclosure, p. 1222, Sep., 1998.

* cited by examiner

Primary Examiner—Paul N. Dickson
Assistant Examiner—Faye M. Fleming
(74) Attorney, Agent, or Firm—Edmund P. Anderson

(57) ABSTRACT

An energy absorber for a steering column includes a pair of plastic guides each of which is molded flat and closes at an integral living hinge around a corresponding one of a pair of serpentine flat metal straps so that the straps are captured in the guides between pairs of convex anvils on the guides. Each guide snaps into a guide slot in a mounting bracket on the steering column mast jacket. An inboard end of each flat metal strap is clamped to a vehicle body so that during a collapse stroke of the mast jacket, relative linear translation between the mounting bracket and the serpentine flat metal straps causes each of the straps to be thrust against and pulled across corresponding ones of the convex anvils. Plastic deformation of the flat metal straps at the convex anvils resist linear translation of the mast jacket. The dimensional accuracy of the molded plastic guides contributes to consistently predictable performance of the energy absorber. Molding the plastic guides flat and closing each around one of the serpentine flat metal straps and then snapping the plastic guides into the guide slots simplifies the assembly and installation of the energy absorber.

19 Claims, 2 Drawing Sheets

US 6,450,532 B1

ENERGY ABSORBER FOR MOTOR VEHICLE STEERING COLUMN

TECHNICAL FIELD

This invention relates to an energy absorber for a motor vehicle steering column.

BACKGROUND OF THE INVENTION

A typical energy absorbing steering column on a motor vehicle includes a housing or mast jacket which translates linearly through a collapse stroke during a collision of the motor vehicle with another object when a steering hand wheel on the steering column is impacted by the operator of the motor vehicle. The mast jacket translates against a resisting force produced by an energy absorber which converts into work a fraction of the kinetic energy of the operator. Commonly, the resisting force is created by plastic deformation of a metal element of the energy absorber. For example, in the energy absorber described in U.S. Pat. No. 3,392,599, steel spheres plastically deform a metal mast jacket by rolling tracks in the mast jacket. In other prior energy absorbers, a U-shaped or a J-shaped flat metal strap attached to the mast jacket is plastically deformed by being pulled over a stationary convex anvil or vice versa. An energy absorber according to this invention is an improvement relative to prior energy absorbers having plastically deformable flat metal straps in that it includes structural features which contribute to consistently predictable performance of the energy absorber and to simple assembly and installation thereof.

SUMMARY OF THE INVENTION

This invention is a new and improved energy absorber for a motor vehicle steering column having a mast jacket supported on a body of the vehicle for linear translation through a collapse stroke in response to an impact on a steering hand wheel on the mast jacket. The energy absorber includes a pair of plastic guides each of which is molded flat and closes at an integral living hinge around a corresponding one of a pair of serpentine flat metal straps so that the straps are captured in the guides between pairs of convex anvils on the guides. Each guide snaps into a guide slot in a mounting bracket on the mast jacket. An inboard end of each flat metal strap is clamped to the vehicle body so that during the collapse stroke of the mast jacket, relative linear translation between the mounting bracket and the serpentine flat metal straps causes each of the straps to be thrust against and pulled across corresponding ones of the convex anvils. Forces attributable to plastic deformation of the flat metal straps at the convex anvils resist linear translation of the mast jacket through its collapse stroke so that a fraction of the kinetic energy of the impact is converted into work. The dimensional accuracy of the molded plastic guides contributes to consistently predictable performance of the energy absorber. Molding the plastic guides flat and closing each around one of the serpentine flat metal straps and then snapping the plastic guides into the guide slots in the mounting bracket simplifies the assembly and installation of the energy absorber for manufacturing economy.

DESCRIPTION OF THE PREFERRED EMBODIMENT

Figure 1:
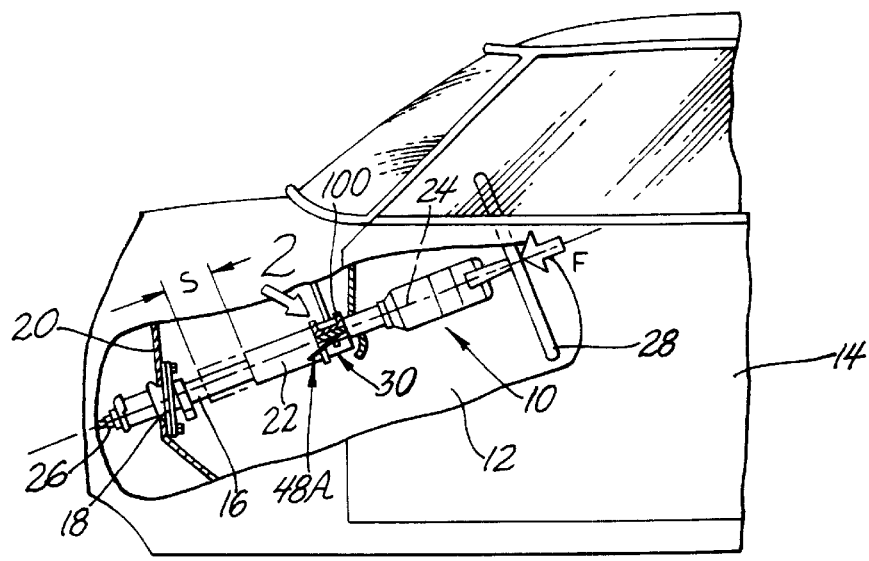
FIG. 1 is an elevational view of an energy absorber according to this invention on a motor vehicle steering column.

Referring to FIG. 1, a steering column 10 is disposed in a passenger compartment 12 of a body 14 of a motor vehicle. The steering column includes a tubular lower mast jacket 16 connected through a lower bracket 18 to a vertical panel 20 of the body 14 at the front of the passenger compartment. A tubular upper mast jacket 22 of the steering column telescopically overlaps the lower mast jacket and is supported thereon for linear translation in the direction of a longitudinal centerline 24 of the steering column. A steering shaft 26 is supported on the upper and lower mast jackets 22,16 for rotation about the longitudinal centerline 24 of the steering column and is connected to a steering gear, not shown, of the motor vehicle in front of the vertical panel 20. A steering hand wheel 28 is attached to the steering shaft 26 at the top of the steering column.

As seen best in FIGS. 1–2, a mounting bracket 30 includes a U-shaped center portion 32 straddling and rigidly attached to the upper mast jacket 22 from below and a pair of substantially horizontal planar flanges 34A,34B on opposite sides the center portion. Each of the planar flanges has an open slot 36 therein facing the steering hand wheel. A pair of capsules 38A,38B are supported on the mounting bracket in the open slots 36 with a side channel 40 around each capsule slidably receiving the edge of the corresponding one of the open slots to retain the capsule in the slot perpendicular to the corresponding planar flange 34A,34B. A plurality of injection molded plastic pins 42 prevent horizontal dislodgement of the capsules from the mounting bracket through the open ends of the slots 36. Each capsule further includes a center passage 44 perpendicular to the corresponding planar flange.

Referring to FIGS. 2–5B, an energy absorber 46 according to this invention includes a pair of identical serpentine flat metal straps 48A,48B and a pair of identical molded plastic guides 50A,50B. Each metal strap includes an inboard end 52 having a perforation 54 therein, an outboard end 56, a pair of concave webs 58A,58B, and a short web 60 between the concave webs, FIGS. 3, 5A and 5B. Each plastic guide is molded flat or open, FIG. 4, and includes an entry guide body 62, an exit guide body 64, and an integral or "living" hinge 66 between the entry and exit guide bodies.

Figure 3:
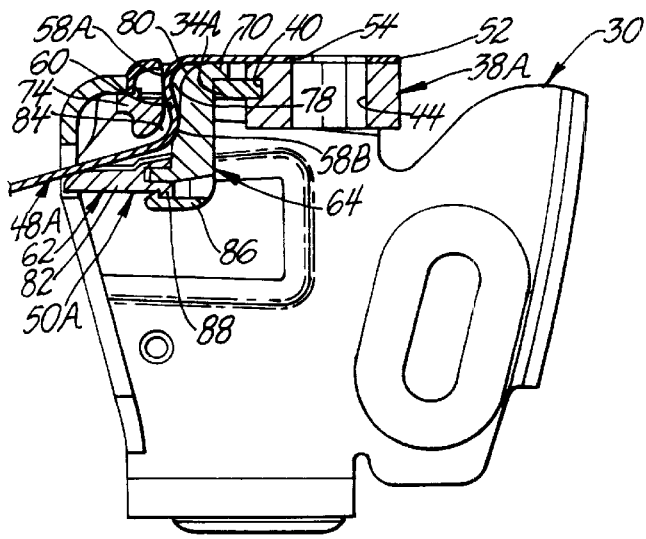
FIG. 3 is a sectional view taken generally along the plane indicated by lines 3—3 in FIG. 2.

The exit guide body 64 of each plastic guide includes a pair of vertical edges 68 and a top lip 70. The entry guide body 62 of each plastic guide includes a pair of vertical edges 72, a top lip 74, and a tower 76 above the top lip 74. Each plastic guide is closed, FIG. 3, when the entry and exit guide bodies 62,64 are pivoted at the living hinge 66 until the vertical edges 68,72 bear against each other. When each plastic guide is closed, a serpentine passage 78, FIG. 3, is defined between its entry and exit guide bodies. The passage 78 is open at the top of the plastic guide adjacent to an upper convex anvil 80 on the exit guide body on one side of the passage and at the bottom between a platform 82 and a lower convex anvil 84 on the entry guide body on the other side of the passage 78 from the upper convex anvil.

Figure 4:
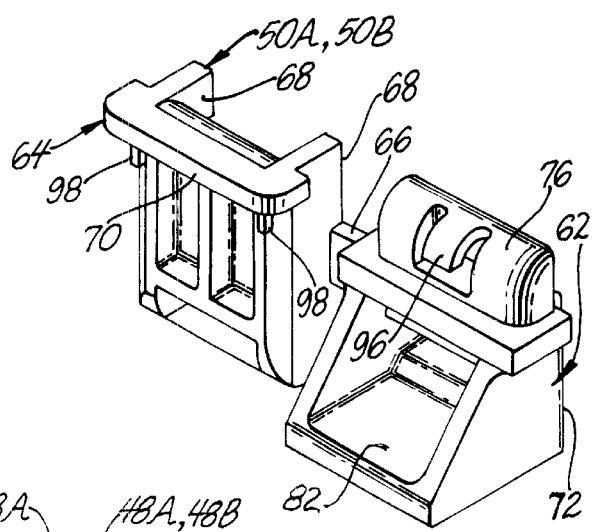
FIG. 4 is a perspective view of a molded plastic guide of the energy absorber according to this invention.
Figure 5A:
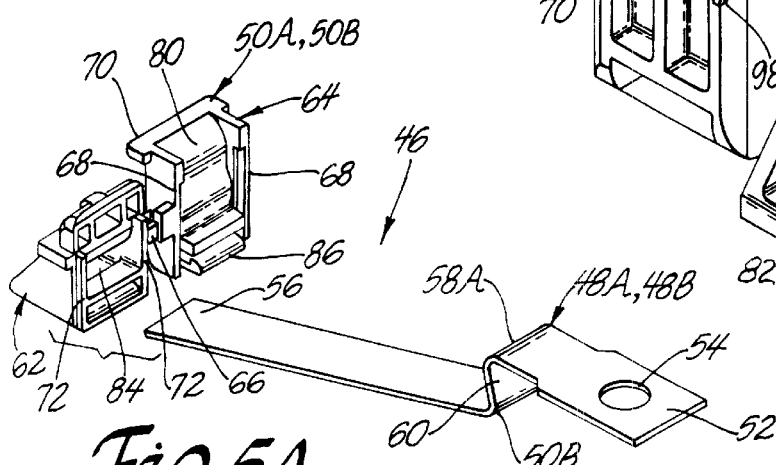
FIGS. 5A–5B are perspective views of the molded plastic guide and a serpentine flat metal strap of the energy absorber according to this invention in different relative positions.
Figure 5B:
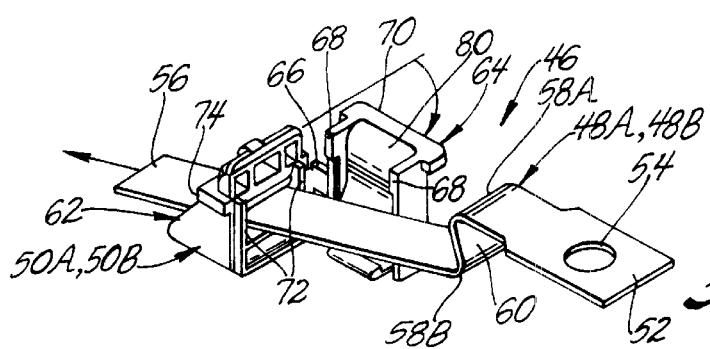

With each of the plastic guides 50A,50B open, FIGS. 4 and 5A, the outboard ends 56 of the flat metal straps 48A,48B are inserted between the platforms 82 and the lower convex anvils 84 of the entry guide bodies 62 and advanced until the webs 60 of the straps abut the entry guide bodies. The plastic guides are then closed around the webs 60 by pivoting the exit guide bodies behind the straps, FIG. 5B. The flat metal straps are thus captured between the entry and exit guide bodies in the serpentine passages 78 with the upper and lower convex anvils 80,84 facing the concave webs 58A,58B and with the inboard and outboard ends 52,56 of the straps exposed outside of the plastic guides. A flexible barb 86 on each exit guide body 64 snaps over a hook 88 on each entry guide body 62, FIG. 3, when the corresponding plastic guide is closed. The barb and the hook thus constitute an automatic retainer operable to couple together the entry and exit guide bodies to retain the plastic guide closed around the corresponding flat metal strap.

Figure 2:
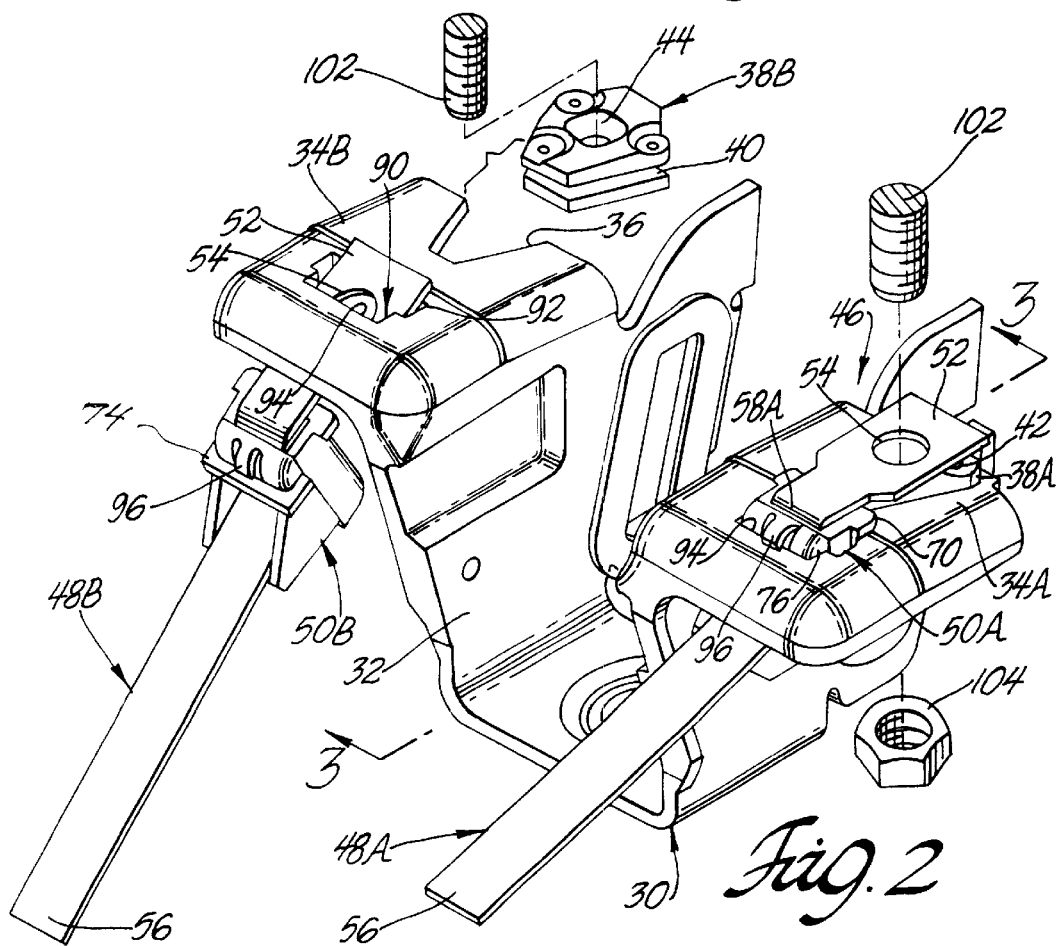
FIG. 2 is a fragmentary and partially exploded perspective view of the energy absorber according to this invention taken generally in the direction of arrow 2 in FIG. 1.

The mounting bracket 30 is perforated by a pair of guide slots 90 in respective ones of the planar flanges 34A,34B each having a first lateral edge 92 and a second lateral edge 94, FIG. 2. The exposed inboard end 52 of each of the flat metal straps 48A,48B is inserted into a respective one of the guide slots 90 from below the corresponding planar flange 34A,34B until the top lip 70 on the exit body 64 of the corresponding plastic guide hooks over the first lateral edge 92 of the guide slot. The top lip 70 cooperates with the first lateral edge 92 in supporting the corresponding plastic guide 50A,50B on the mounting bracket for upward pivotal movement to a seated position, FIGS. 2–3, defined by engagement of the top lip 74 on the corresponding entry guide body against the bottom of the corresponding planar flange 34A, 34B adjacent to the second lateral edge 94 of the guide slot.

As each plastic guide approaches its seated position, an integral cantilever spring 96 on the tower 76 of its entry guide body is flexed inward by the second lateral edge 94 of the corresponding guide slot and snaps over the corresponding planar flange so that the tower, the spring, and the second lateral edge 94 constitute an automatic latch retaining the plastic guide in its seated position. At the same time, a pair of crush ribs 98, FIG. 4, on the exit guide body 64 of each plastic guide are wedged against the edges of the corresponding guide slot 90 and thereby crushed between the plastic guide and the mounting bracket. The crush ribs thus assure an interference fit between each plastic guide and the mounting bracket to eliminate dimensional clearance or "lash" which otherwise could manifest itself as looseness of the plastic guides.

With the plastic guides 50A,50B in their seated positions, the perforation 54 at the inboard end 52 of each of the flat metal straps 48A,48B overlaps the passage 44 in the corresponding one of the capsules 38A,38B. The capsules and the corresponding inboard ends of the flat metal straps are then rigidly clamped to a schematically represented upper bracket 100, FIG. 1, on the vehicle body above the upper mast jacket by a pair of bolts 102 through the perforations 54 and the passages 44 and a pair of nuts 104 on the bolts below the capsules. The bolts and nuts 102,104 thus also cooperate with the capsules 38A,38B and the mounting bracket 30 in supporting the upper mast jacket 22 vertically on the vehicle body.

An impact "F" on the steering hand wheel fractures the plastic pins 42 and initiates horizontal separation of the mounting bracket 30 from the capsules 38A,38B through the open slots 36 and linear translation of the upper mast jacket 22 relative to the lower mast jacket 16 through a collapse stroke "S", FIG. 1. Since the inboard end 52 of each flat metal strap 48A,48B is clamped to the vehicle body, the mounting bracket 30 and the plastic guides 50A,50B commence linear translation relative to the flat metal straps with the straps entering the passages 78 in the plastic guides at the bottoms of the entry guide bodies and exiting the passages at the tops of the exit guide bodies. Concurrently, the concave webs 58A,58B of each of the flat metal straps are thrust against the upper and lower convex anvils 80,84 on the corresponding plastic guides and the convex anvils are pulled along each flat metal strap toward its outboard end 56. The curvature of the convex anvils causes plastic deformation of the corresponding flat metal strap as the convex anvils are pulled along the strap. Forces attributable such plastic deformation resist linear translation of the upper mast jacket 22 through its collapse stroke S thereby to convert into work a fraction of the kinetic energy of the impact F.

The snap-in attachment of the plastic guides 50A,52B on the mounting bracket 30 permits simple installation of the energy absorber 46 on the mounting bracket without special tools to minimize manufacturing and installation cost. Also, the plastic guides are precision molded at reasonable cost for predictable and consistent performance of the energy absorber attributable to consistent contact geometry between the convex anvils on the plastic guides and the flat metal straps.

Having thus described the invention, what is claimed is:

1. An energy absorber comprising:

a mounting bracket having a guide slot therein, a guide formed of plastic having a serpentine passage therethrough including a first plastic convex anvil on a first side of the serpentine passage and a second plastic convex anvil on a second side of the serpentine passage opposite the first side, a retainer formed as one piece with the guide and operable in response to forcibly pushing the guide into the guide slot to a seated position therein to automatically engage and secure the guide on the mounting bracket, and a serpentine flat metal strap traversing the plastic guide through the serpentine passage including a first concave web facing the first convex anvil and a second concave web facing the second convex anvil, the flat metal strap being plastically deformed by being thrust against and pulled across each of the first and second convex anvils during relative linear translation between the mounting bracket and the flat metal strap so that such relative linear translation is resisted by a force attributable to the plastic deformation of the flat metal strap.

2. The energy absorber recited in claim 1 wherein the retainer comprises:

a first lip on the plastic guide hooked over a first edge of the guide slot in the mounting bracket and cooperating therewith in supporting the plastic guide on the mounting bracket for pivotal movement toward the seated position in the guide slot, a second lip on the plastic guide engageable on the mounting bracket to stop pivotal movement of the plastic guide at the seated position thereof, and an automatic latch operable to retain the plastic guide in the seated position.

3. The energy absorber recited in claim 2 wherein the automatic latch comprises:

an integral cantilever spring on the plastic guide resiliently flexed by the second edge of the guide slot during pivotal movement of the plastic guide to the seated position and snapping over the mounting bracket in the seated position of the plastic guide.

4. The energy absorber recited in claim 3 further comprising:

an integral crush rib on the plastic guide crushed between the plastic guide and the mounting bracket in the seated position of the plastic guide in the guide slot thereby to eliminate lash between the plastic guide and the mounting bracket.

5. The energy absorber recited in claim 4 wherein the plastic guide comprises:

an entry guide body having the first convex anvil thereon, an exit guide body having the second convex anvil thereon, an integral hinge connecting the entry and exit guide bodies for pivotal movement between relative positions corresponding to the plastic guide being open and relative positions corresponding to the plastic guide being closed and defining therebetween the serpentine passage when the plastic guide is closed, and a retainer operable to couple together the entry guide body and the exit guide body when the plastic guide is closed thereby to retain the plastic guide closed around the flat metal strap.

6. The energy absorber recited in claim 5 wherein the retainer comprises:

a hook on a first one of the entry guide body and the exit guide body, and a resiliently flexible barb on a second one of the entry guide body and the exit guide body which snaps behind the hook when the plastic guide is closed thereby to couple together the entry guide body and exit guide body.

7. An energy absorbing steering column including:

a mast jacket supported on a body structure for linear translation in the direction of a longitudinal centerline of the steering column in response to an impact on a steering hand wheel on the mast jacket, a mounting bracket rigidly attached to the mast jacket, a capsule rigidly clamped to the body structure having a side channel slidably receiving the edges of a capsule slot in the mounting bracket so that the mast jacket is supported vertically on the body structure and the mounting bracket is separable horizontally from the capsule concurrent with linear translation of the mast jacket in the direction of the longitudinal centerline of the steering column, and an energy absorber for converting into work a fraction of the kinetic energy of the impact on the steering hand wheel concurrent with linear translation of the mast jacket in the direction of the longitudinal centerline of the steering column, characterized in that the energy absorber comprises:

a guide slot in the mounting bracket, a plastic guide having a serpentine passage therethrough including a first convex anvil on a first side of the serpentine passage and a second convex anvil on a second side of the serpentine passage opposite the first side, a retainer operable to automatically retain the plastic guide in the guide slot in the mounting bracket when the plastic guide is pushed into the guide slot to a seated position therein, a serpentine flat metal strap traversing the plastic guide through the serpentine passage including a first concave web facing the first convex anvil and a second concave web facing the second convex anvil and a inboard end exposed outside of the plastic guide, and an attachment operable to attach the inboard end of the flat metal strap to the body structure so that the flat metal strap is plastically deformed by being thrust against and pulled across each of the first and the second convex anvils during relative linear translation between the mounting bracket and the flat metal strap and such relative linear translation is resisted by a force attributable to the plastic deformation of the flat metal.

8. The steering column recited in claim 7 wherein the retainer comprises:

a first lip on the plastic guide hooked over a first edge of the guide slot in the mounting bracket and cooperating therewith in supporting the plastic guide on the mounting bracket for pivotal movement toward the seated position in the guide slot, a second lip on the plastic guide engageable on the mounting bracket to stop pivotal movement of the plastic guide at the seated position thereof, and an automatic latch operable to retain the plastic guide in the seated position.

9. The steering column recited in claim 8 wherein the automatic latch comprises:

an integral cantilever spring on the plastic guide resiliently flexed by the second edge of the guide slot during pivotal movement of the plastic guide to the seated position and snapping over the mounting bracket in the seated position of the plastic guide.

10. The steering column recited in claim 9 further comprising:

an integral crush rib on the plastic guide crushed between the plastic guide and the mounting bracket in the seated position of the plastic guide in the guide slot thereby to eliminate lash between the plastic guide and the mounting bracket.

11. The steering column recited in claim 10 wherein the plastic guide comprises:

an entry guide body having the first convex anvil thereon, an exit guide body having the second convex anvil thereon, an integral hinge connecting the entry and exit guide bodies for pivotal movement between relative positions corresponding to the plastic guide being open and relative positions corresponding to the plastic guide being closed and defining therebetween the serpentine passage when the plastic guide is closed, and a retainer operable to couple together the entry guide body and the exit guide body when the plastic guide is closed thereby to retain the plastic guide closed around the flat metal strap.

12. The steering column recited in claim 11 wherein the retainer comprises:

a hook on a first one of the entry guide body and the exit guide body, and a resiliently flexible barb on a second one of the entry guide body and the exit guide body which snaps behind the hook when the plastic guide is closed thereby to couple together the entry guide body and exit guide body.

13. The steering column recited in claim 12 wherein the attachment operable to attach the inboard end of the flat metal strap to the body structure comprises:

a perforation in the inboard end of the flat metal strap registering with a passage in the capsule, a vertical bolt rigidly attached to the body structure and protruding through the passage in the capsule and the perforation in the in board end of the flat metal strap, and a nut on the vertical bolt below the capsule cooperating with the bolt in rigidly clamping the capsule and the inboard end of the flat metal strap against the body structure above the capsule.

14. An energy absorber, comprising:

a mounting bracket having a mounting slot therein;

a serpentine flat metal strip having a first concave web and a second concave web; and a guide formed as a separate component from said mounting bracket and mounted within said guide slot of said mounting bracket, said guide having a guide body fabricated of plastic material and defining a serpentine passage through said guide body in which said metal strip is disposed and defining a first convex anvil of said plastic guide body facing said first concave web of said metal strip and a second convex anvil of said plastic guide body facing said second concave web of said metal strip, said guide body including laterally spaced side walls closing said serpentine passage on laterally opposite sides thereof independent of the mounting slot of the mounting bracket.

15. The energy absorber of claim 14 wherein said plastic guide body includes plastic snap-lock portions extending from said guide body and engagable with associated structure of said mounting bracket to automatically lock and retain said guide body on said mounting bracket in response to forcibly pushing said guide body into said guide slot.

16. The energy absorber of claim 14 wherein said guide body is formed of two parts separable across mating edges thereof.

17. The energy absorber of claim 16 including a living hinge joining said two parts of said guide body.

18. The energy absorber of claim 16 wherein one of said guide body parts includes said first convex anvil and said the other of said guide body parts includes said second convex anvil.

19. The energy absorber of claim 16 wherein said parts of said guide body are closeable about said metal strip so as to completely surround said metal strip transversely of its length.

* * * * *